(12) United States Patent
Boulos et al.

(10) Patent No.: US 7,572,315 B2
(45) Date of Patent: Aug. 11, 2009

(54) PROCESS FOR THE SYNTHESIS, SEPARATION AND PURIFICATION OF POWDER MATERIALS

(75) Inventors: Maher I. Boulos, Québec (CA);
Christine Nessim, Québec (CA);
Christian Normand, Québec (CA);
Jerzy Jurewicz, Sherbrooke (CA)

(73) Assignee: Tekna Plasma Systems Inc., Sherbrooke, Quebec (CA)

( * ) Notice: Subject to any disclaimer, the term of this patent is extended or adjusted under 35 U.S.C. 154(b) by 151 days.

(21) Appl. No.: 10/569,916

(22) PCT Filed: Aug. 19, 2004

(86) PCT No.: PCT/CA2004/001525

§ 371 (c)(1),
(2), (4) Date: Nov. 14, 2006

(87) PCT Pub. No.: WO2005/021148

PCT Pub. Date: Mar. 10, 2005

(65) Prior Publication Data

US 2007/0130656 A1 Jun. 7, 2007

Related U.S. Application Data

(60) Provisional application No. 60/498,276, filed on Aug. 28, 2003.

(51) Int. Cl.
*B22F 9/14* (2006.01)
(52) U.S. Cl. .......................................... 75/336; 75/346
(58) Field of Classification Search .................... 75/346
See application file for complete search history.

(56) References Cited

U.S. PATENT DOCUMENTS

| | | | |
|---|---|---|---|
| 4,952,144 A | 8/1990 | Hansz et al. | 425/10 |
| 6,569,397 B1 | 5/2003 | Yadav et al. | 423/345 |
| 2006/0130610 A1 * | 6/2006 | Ward-Close et al. | 75/345 |

FOREIGN PATENT DOCUMENTS

| | | |
|---|---|---|
| CA | 1202599 | 4/1986 |
| CA | 2320529 | 3/2001 |
| CN | 1069668 | 3/1993 |
| DE | 19828914 A1 * | 12/1999 |
| JP | 2001/252588 A * | 9/2001 |
| JP | 2004/091843 | 3/2004 |

OTHER PUBLICATIONS

Chen, P. et al., "Synthesis of Cu Nanoparticles and Microsized Fibers by Using Carbon Nanotubes as a Template", Physical Chemistry B, vol. 103, No. 22, Jun. 3, 1999, pp. 4559-4561.*

* cited by examiner

*Primary Examiner*—George Wyszomierski
(74) *Attorney, Agent, or Firm*—Fulbright & Jaworski L.L.P.

(57) ABSTRACT

The invention concerns a process for the spheroidisation, densification and purification of powders through the combined action of plasma processing, and ultra-sound treatment of the plasma-processed powder. The ultra-sound treatment allows for the separation of the nanosized condensed powder, referred to as 'soot', from the plasma melted and partially vaporized powder. The process can also be used for the synthesis of nanopowders through the partial vaporization of the feed material, followed by the rapid condensation of the formed vapour cloud giving rise to the formation of a fine aerosol of nanopowder. In the latter case, the ultra-sound treatment step serves for the separation of the formed nanopowder form the partially vaporized feed material.

27 Claims, 9 Drawing Sheets

Fig-6D
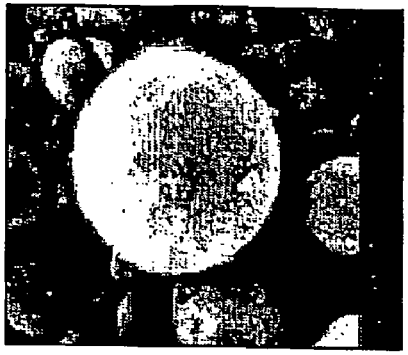
Fig-7D
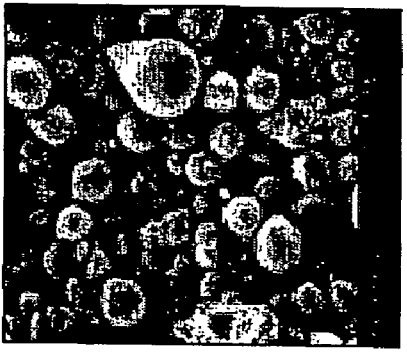
Fig-7C
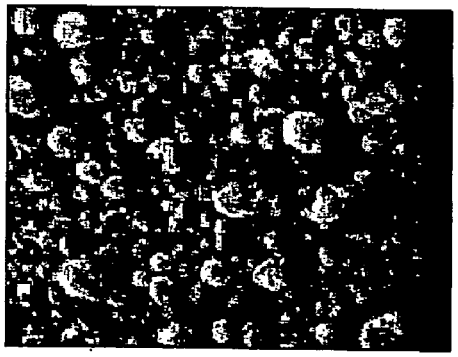
Fig-6C
Fig-6B
Fig-6A
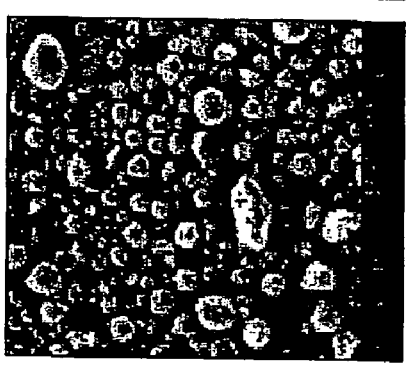
Fig-7B
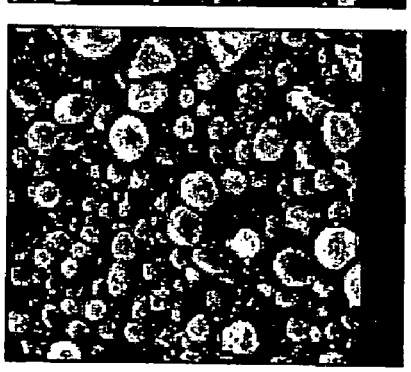
Fig-7A

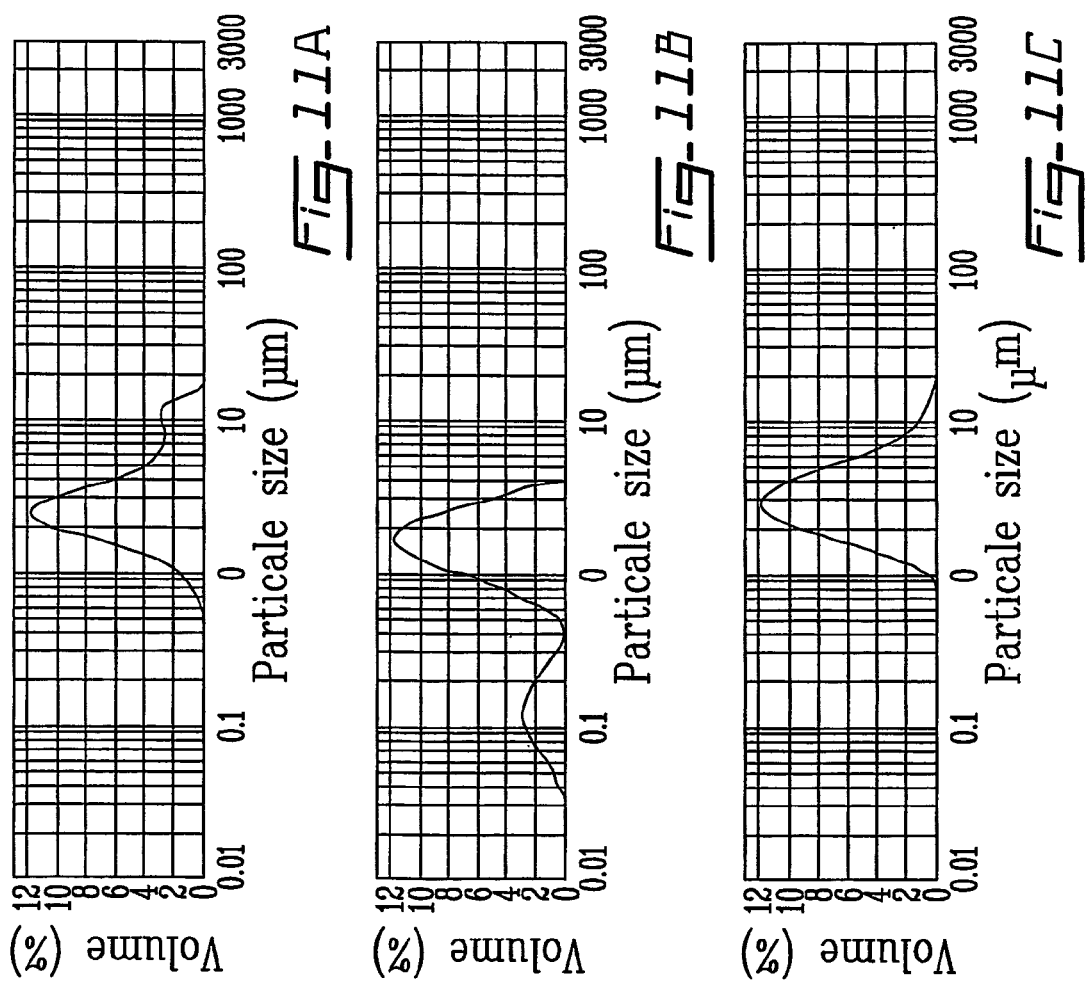

PROCESS FOR THE SYNTHESIS, SEPARATION AND PURIFICATION OF POWDER MATERIALS

This application is a national phase application under 35 U.S.C. § 371 of International Application No. PCT/CA2004/001525 filed Aug. 19, 2004, which claims benefit of U.S. Provisional Application No. 60/498,276, filed Aug. 28, 2003. The contents of these applications are incorporated by reference.

FIELD OF THE INVENTION

The present invention relates to processes for the synthesis, separation and purification of powder materials. More specifically, the present invention is concerned with processes involving materials transformation under plasma conditions

BACKGROUND OF THE INVENTION

The processing of powder materials through the in-flight melting of the individual particles under plasma conditions followed by the solidification of the formed droplets has been known for some time and is attracting increasing attention as a means of densification and spheroidisation materials in powder form. The process, generally known as powder spheroidisation, results in a significant improvement of the flow properties of the powders, and the increase of their resistance to attrition during their handling and transport.

The powder spheroidisation process has also been recognized as an effective means for the proper control of the chemical composition of the powder materials as well as for the synthesis of new materials and composite mixtures.

Through the use of inductively coupled, radio frequency (r.f.) electrodless discharges, as a heat source for the process, it has also been observed that the process can be used for the significant purification of the powder being treated through the partial loss of some of the impurities either as a result of a simple volatilization step from the molten droplets, or the reactive volatilization of the impurities. In the former case, the impurities of lower boiling point compared to that of the particle matrix are preferentially vaporized; the gaseous impurities can escape from the particle matrix. In the latter case, the impurity is chemically transformed at the surface of the molten droplet through its contact with the processing environment, followed by the volatilization of the formed compound. The chemical reaction involved can be, though not limited to, for example, the oxidation of the impurities through their contact with oxygen in the plasma flow. The process results in a net reduction of the level of impurities in the powder and subsequently its purification.

The problem that arises in such circumstances, however, is that the formed vapour cloud of the impurities, whether they are in their elemental form, or as a compound, remains mixed with the plasma gas transporting the purified powder. As the overall plasma stream with its powder content is cooled down, the impurities also condenses in the form of a very fine soot that deposits on all available surfaces in the reactor including the surface of the processed/purified powders which are then contaminated again with the same impurities that were eliminated in the first place. In the case of metal powder, this soot is composed of very fine metallic particle. These fine particles are, in turn, very sensitive to oxidation when they come in contact with the ambient air, with which they react, resulting in the significant increase of the oxygen content of the powder.

In a different context, the induction plasma processing of powders has also been successfully used for the synthesis of metallic and ceramic nanopowders through the in-flight heating, melting and vaporization of the feed precursor followed by the rapid quench of the formed vapours in order form a fine aerosol of nanopowder thorough the homogenous condensation of the vapour cloud. In such a case, however, the formed aerosol of nanopowder is mixed with residual fraction of the feed material, which is only partially vaporized, resulting in a mixed powder with a broad particle size distribution. Depending on the operating conditions, the collected powder can often have a bimodal particle size distribution, which represents a major limitation to the acceptance of such a powder for most nanopowder applications.

OBJECTS OF THE INVENTION

An object of the present invention is therefore to provide an improved process for the synthesis of powder materials.

Another object of the invention is to provide an improved process for the separation and/or purification of powder materials.

SUMMARY OF THE INVENTION

The present invention concerns a process for the spheroidisation, densification and purification of powders through the combined action of plasma processing, and ultra-sound treatment of the plasma-processed powder. The ultra-sound treatment allows for the separation of the nanosized condensed powder, referred to as 'soot', from the plasma melted and partially vaporized powder. The process can also be used for the synthesis of nanopowders through the partial vaporization of the feed material, followed by the rapid condensation of the formed vapour cloud giving rise to the formation of a fine aerosol of nanopowder. In the latter case, the ultrasound treatment step serves in this case for the separation of the formed nanopowder form the partially vaporized feed material.

More specifically, in accordance with a first aspect of the present invention, there is provided a process for the purification of a material comprising:

providing powder particles of the material including impurities;

plasma heating and melting of the powder particles of the material and release of the impurities in vapour phase through a plasma stream, yielding molten particle droplets of the material mixed in the plasma stream and vaporized impurities;

cooling of the molten particle droplets of the material mixed in the plasma stream with the vaporized impurities, yielding a mixture of purified powder particles of the material and soot;

exposing the mixture of purified powder particles of the material and soot material to ultrasound vibrations in a sonification medium, yielding separated purified powder particles of the material and soot in the sonification medium; and recovering the purified powder particles of the material from the sonification medium and the soot.

According to a second aspect of the present invention, there is provided a process for the separation of nanopowder mixed with a coarse powder by exposing the nanopowder mixed with the coarse powder to ultrasound vibrations in a sonification medium.

According to a third aspect of the present invention, there is also provided a process for the synthesis of a material nanopowder comprising:

i) providing the material in powder form;
ii) plasma heating, melting and vaporization of the powder of the material through a plasma stream, yielding the material in vapour form mixed with partially vaporized particles in the plasma stream;
iii) running the material in vapour form mixed partially vaporized particles in the plasma stream through a quench stream, yielding a mixture of formed material nanopowder and residual coarse material powder; and
iv) exposing the mixture of formed material nanopowder and residual coarse material powder to ultrasound vibrations in a sonification medium, yielding separated nanopowder particles of the material and coarse powder of the material.

Processes for the synthesis or purification of material according to the present invention allows for the purification of powder material for the manufacture high purity materials such as solar cells and sputtering target for example.

A process for the synthesis of nanopowders according to the present invention allows for the separation of the synthesized nanopowder from the remaining partially vaporized precursor material through intense ultrasound action identified in the present invention as a sonification process.

Processes according to the present invention allows to purify, synthesize and separate powders of a wide range of materials including, but not limited to ceramics, alloys, composites, and pure metals including, but not limited to, silicon, chromium, molybdenum, tungsten, tantalum and ruthenium.

Other objects, advantages and features of the present invention will become more apparent upon reading the following non restrictive description of preferred embodiments thereof, given by way of example only with reference to the accompanying drawings.

BRIEF DESCRIPTION OF THE DRAWINGS

In the appended drawings:
FIGS. 6A-6D are electron micrographs of silicon powder following plasma treatment according to the first steps of the process from FIG. 1, but before the sonification step of the process from FIG. 1;
FIGS. 7A-7D are electron micrographs of silicon powder corresponding respectively to FIGS. 6A-6D after the sonification step of the process from FIG. 1;
FIGS. 11A-11C are graphs illustrating the particle size distribution of the tungsten powder respectively illustrated in FIGS. 10A-10C.

DETAILED DESCRIPTION OF THE INVENTION

Figure 1:
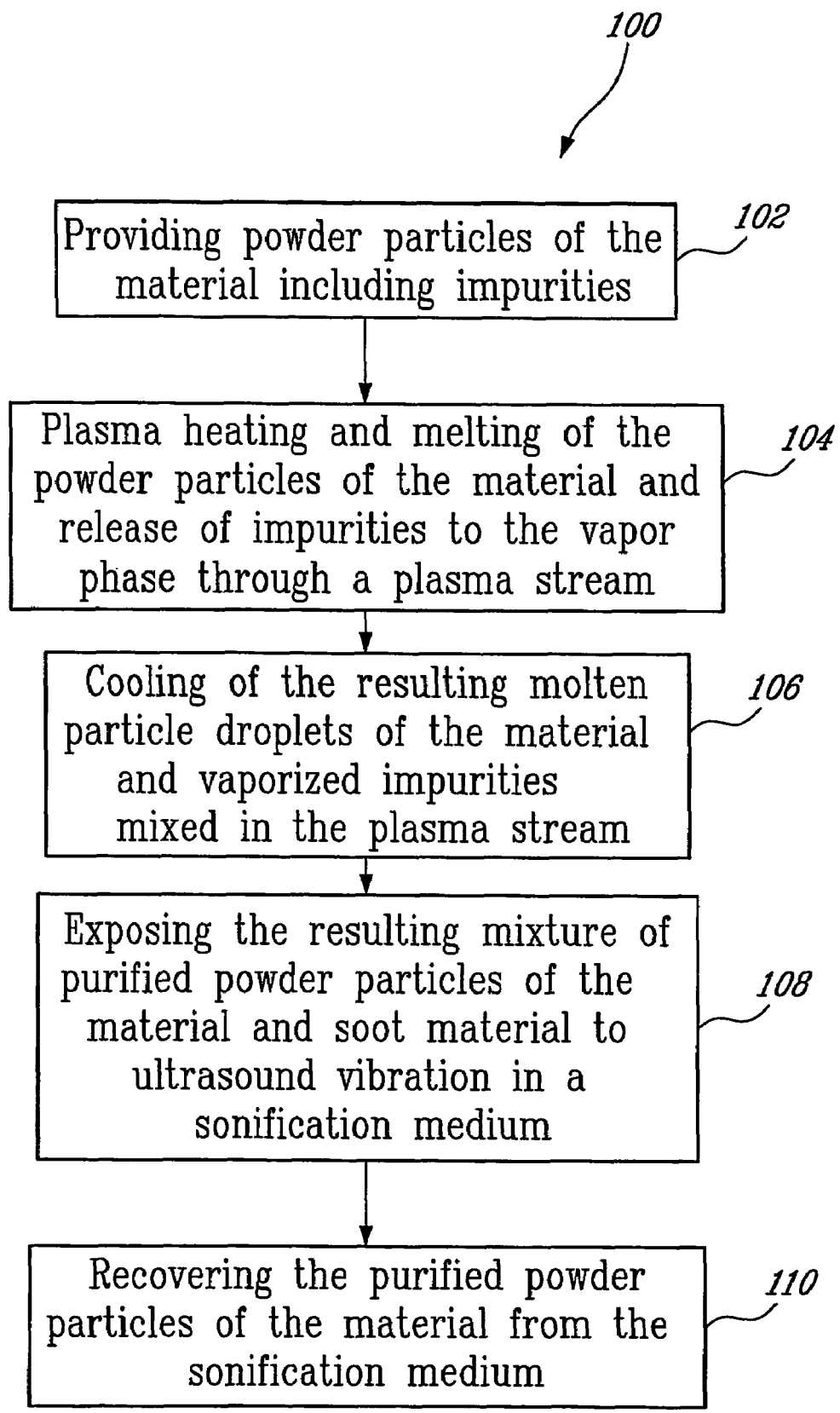
FIG. 1 is a flowchart illustrating a process for the purification of powder materials according to an illustrated embodiment of the present invention.

A process 100 for the purification of a material according to an illustrative embodiment of the present invention will now be described with reference to FIG. 1.

In step 102, the material is provided in the form of raw powder. The powder particles are then inserted axially into the center of an inductively coupled, radio frequency plasma stream.

Figure 2:
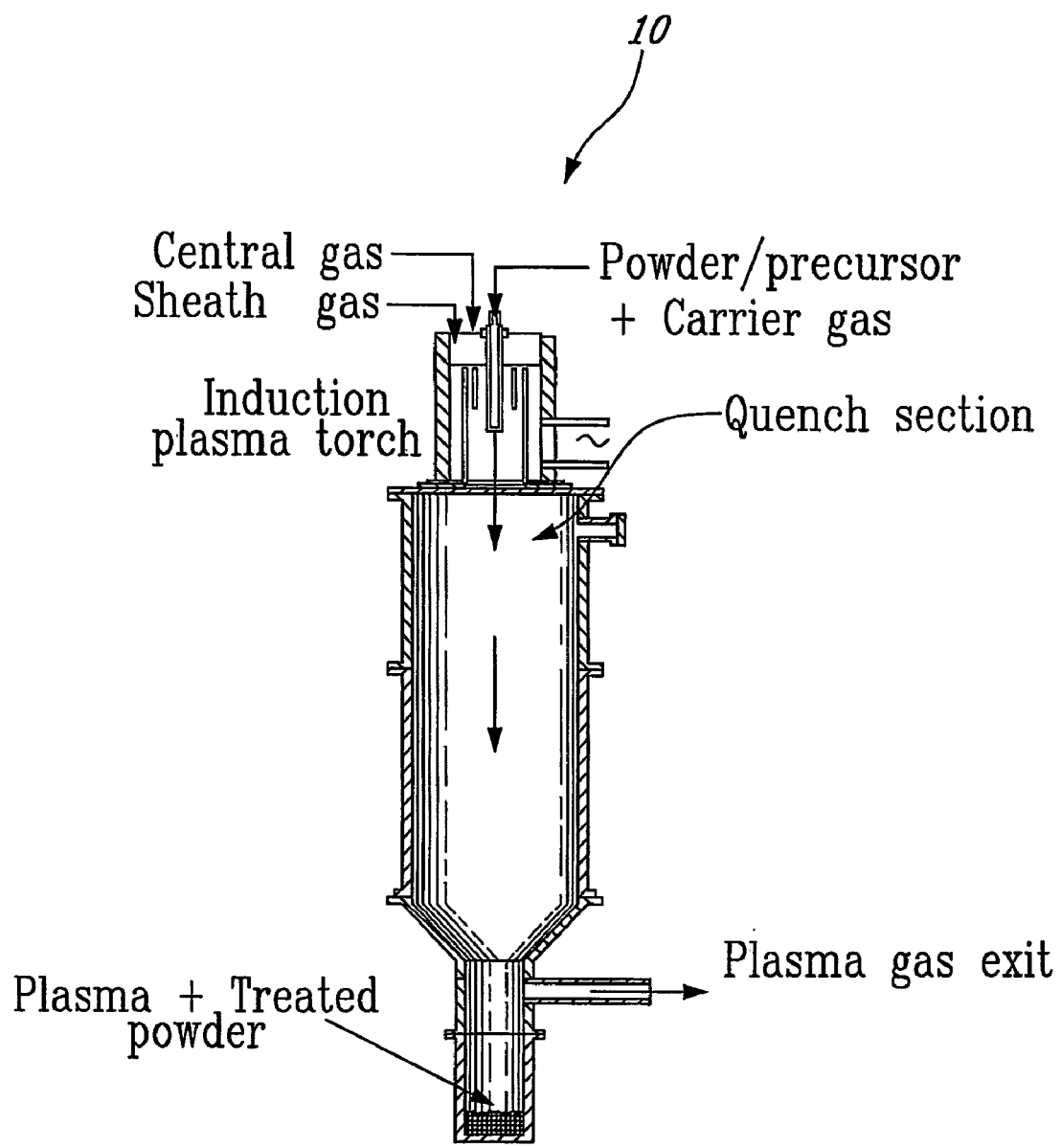
FIG. 2 is a schematic view of a plasma reactor for performing a first part of the process from FIG. 1.

In step 104, the powder particles of the material are then heated and melted as they are injected into the center of an inductively coupled radio frequency (r.f.) plasma reactor 10, which is illustrated in FIG. 2.

Indeed, as the individual powder particles come in contact with the plasma stream, they are heated and melted in a relatively short time, of the order of milliseconds, yielding molten particle droplets of the material mixed in the plasma stream. In addition to the melting of the particle of material, step 102 also causes the partial vaporization of the particle material itself and/or of any impurities in them. Encapsulated impurities in the particles can also find their way during the melting step to the surface of the particle under the influence of surface tension effects.

Concerning the plasma reactor operation, the plasma gas composition is an inert, an oxidizing or a reducing atmosphere depending on the chemistry of the materials processed and the impurities present.

The operating pressure is atmospheric, low pressure, 'soft vacuum', or above atmospheric pressure. The evaporation can be the result of a simple volatilization of the particle material, or the separation of impurities from the particle in a vapor phase without involving any chemical transformation. A reactive evaporation involving a chemical transformation of the particle material, or the impurities present, is also possible through their interaction with the plasma gas, followed by the evaporation of the formed chemical compounds.

Since such a r.f. plasma reactor is believed to be well known in the art, it will not be described herein in more detail. It is to be noted that other types of plasma reactor such as direct current (d.c.) plasma jets or a capacitive coupled r.f. plasma, or a microwave plasma can be also used to heat and melt the powder particles.

In step 106, the resulting molten particle droplets of the material mixed the plasma stream are then cooled, resulting in the solidification and spheroidisation of the molten particle droplets of purified material, and the condensation of the transported vapours in the form of a nanosized aerosol which deposits on all available surfaces of the plasma reactor 10 and the surface of the transported solidified particle droplets. The latter case results in a soot-like material being mixed with the purified powder.

Figure 3A:
FIGS. 3A and 3B are electron micrographs of respectively plasma spheroidised silicon and ruthenium powder particles following steps 104-106 of the process from FIG. 1, illustrating webs of agglomerated nanopowders soot condensed on the powder particles.
Figure 3B:
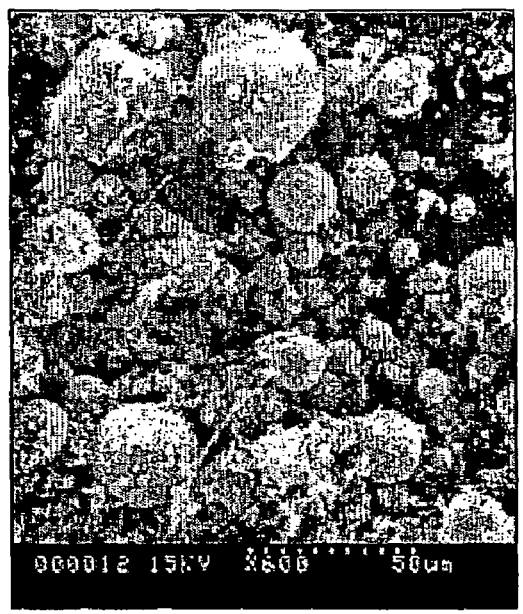

FIGS. 3A and 3B show two example of agglomerated nanopowder soot condensed respectively on silicon and ruthenium solidified particle droplet following steps 102-106 of the process 100.

As illustrated in FIGS. 3A-3B, step 106 results in a loss of the purification action achieved during the plasma step.

To achieve the separation of the soot-like nanosized particles from the solidified particles droplets and therefore achieving the purification thereof, the resulting mixture of powder particles of the material and soot material are exposed to intense ultrasound vibrations in a sonification medium (step 108). Depending on the volume of the sonification medium and its powder loading, the required intensity of sonification can be as low as a hundred Watts, and as high as a few kilowatts. The separation is achieved through the Faraday wave pattern composed of standing waves setup in response to intense coherent vibration Since the Faraday wave principal is believed to be well known in the art, it will not be described herein in more detail.

Figure 4:
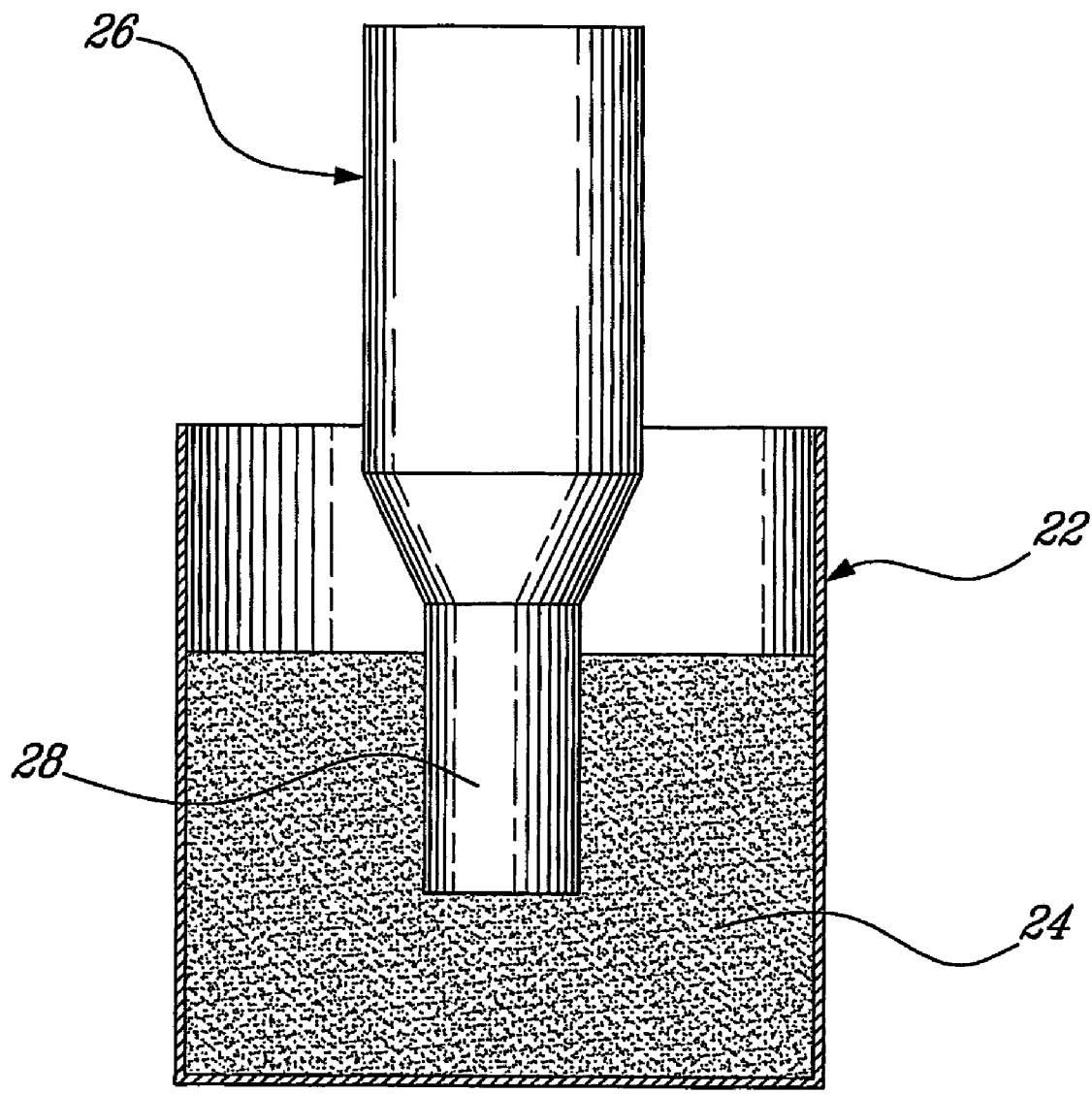
FIG. 4 is a schematic view of a sonification assembly for performing a second part of the process from FIG. 1.

An example of an ultrasound assembly 20 that can be used to carry out step 108 is illustrated in FIG. 4. The assembly 20 comprises a small, water-cooled, glass beaker 22, which is filled with the mixture of powder particles of the material and soot material resulting from step 102-106 in suspension in an appropriate sonification liquid such as, though not limited to, water, acetone or alcohol (generally referred to in FIG. 4 with numeral reference 24).

The assembly 20 further comprises an ultrasound generation probe 26. The tip 28 of the ultrasound generation probe 26 is immersed into the suspension 24 and energized to expose the powder to intense vibration and cause the dislodging of the nanosized 'soot' particles from the surface of the larger purified or partially vaporized powder particles.

Even though step 108 is illustrated as being carried out in a sonification liquid, it can also be carried out in other sonification medium such as air.

Of course, other type of container can be used to carry the suspension 24. The sonification medium can be already provided in the plasma treated collection chamber of the plasma reactor 10 (see FIG. 2). Also, the assembly 20 may take many other forms allowing exposing the mixture of soot-like nanosized particles and solidified particles droplets to ultrasound.

Since ultrasound probes are believed to be well known in the art, they will not be described herein in more detail.

The next step (110) is the recovering of the purified powder particles of the material from the sonification medium.

Step 110 first includes the separation of the two particle fractions (the separated powder and the nanosized soot), for example, by wet sieving or differential sedimentation under normal gravitational forces, or by intense centrifugation under multiple values of gravitational forces. Then, the separated powder and/or nanosized soot are recovered from the sonification medium by filtration followed by a final evaporation/drying step in cases when step 108 is carried out in a liquid medium and, if necessary, vacuum packing.

Other purified powder material recovering process may alternatively be used.

Figures 5A, 5B, 5C:
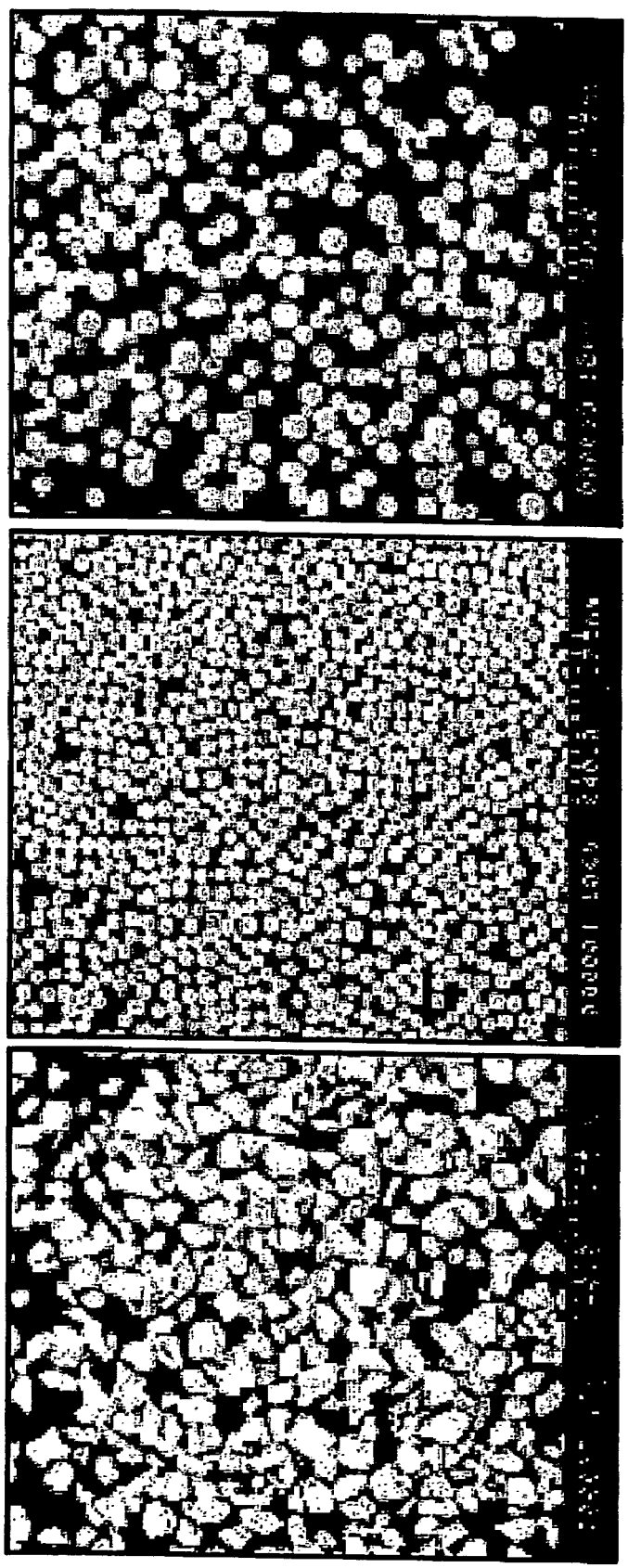
FIGS. 5A, 5B and 5C are electron micrographs of respectively raw WC powder particles, and two examples of spheroidised WC powder particles obtained through the process from FIG. 1.
Figure 8A:
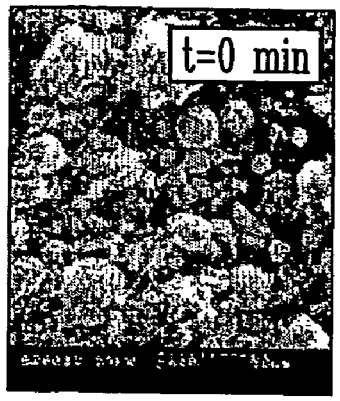
FIGS. 8A-8E are electron micrographs of plasma processed ruthenium powder obtained trough the process from FIG. 1, after increasing period of sonification time.
Figure 8B:
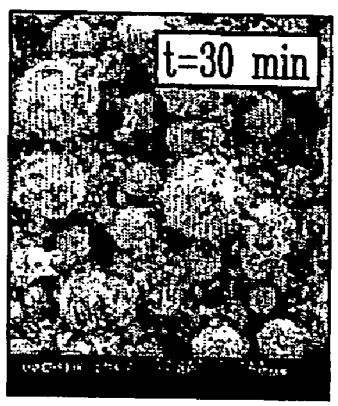
Figure 8C:
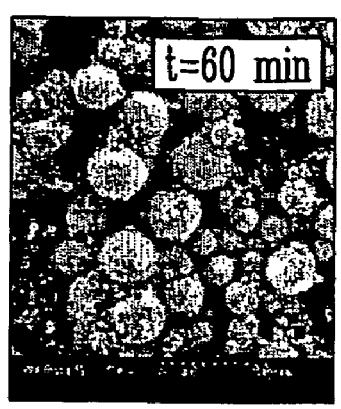
Figure 8D:
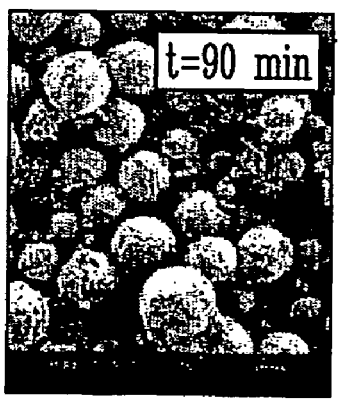
Figure 8E:
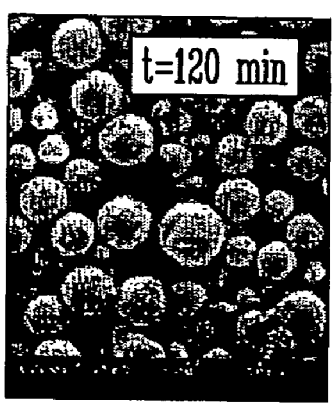

The powder treatment process 100 allows improving the flow properties of the powder. Indeed, Hall tests have been performed on spheroidised powder particles following the process 100. For example, it has been measured that raw WC (tungsten carbide) powder, which is illustrated in FIG. 5A has a Hall flow value of 54.3 s/20 cm³, while WC powder spheroidised following the process 100, which is illustrated in FIG. 5B and 5C, shows a Hall flow value of 32.5 and 34.3 s/20 cm³ respectively.

In the following, specific examples of applications of the process 100 using the apparatuses 10 and 20 will now be described. The specific examples will highlight additional features and advantages of a purification process from the present invention.

Purification of Silicon Powder for Solar Grade Silicon Applications

The first example relates to the purification of silicon powder for solar grade silicon applications. According to this first example, medium purity silicon powder is melted through its exposure to an argon/hydrogen inductively coupled plasma discharge operating at near atmospheric pressure according following steps 102-106 from the process 100.

The collected powder is composed of individual spheroidal particles mixed with a network of agglomerated nanosized soot particles condensed on its surface.

Following step 108 of the process 100, the soot is separated from the purified silicon particles through intense sonification in an acetone bath followed by differential sedimentation, filtration and drying, this latter steps corresponding to step 110 of the process 100.

Electron micrographs of the silicon particles after the plasma treatment, prior and after the intense sonification step 108 are shown in FIGS. 6A-6D and 7A-7D respectively. The corresponding values of BET (Brunauer Emmett Teller) specific surface area analysis of the powder are given in Table 1.

TABLE 1

BET specific surface area analysis of the plasma treated powder before and after the sonification step 108 at power levels of 17 W and 100 W

| BET m²/g 17 W Sonification | | BET m²/g 100 W Sonification | | Wt of powder (g) 100 W Sonification | |
|---|---|---|---|---|---|
| Before | After | Before | After | Before | After |
| 0.332 | 0.302 | 0.332 | 0.11 | 14.86 | 13.59 |

The results given for two levels of ultrasound intensity (17 W and 100 W) for the same period of exposure time, show that better results are obtained by using at least a minimum level of power for the sonification step, which is more precisely within the range of about 50 to 100 W. The results illustrated in Table 1 show a visible reduction of the soot deposition level on the surface of the powder particles as demonstrated by the considerable drop of its specific surface area.

Purification of Ruthenium for Electronic Applications

The second example concerns the purification of ruthenium for electronic applications. According to this example, ruthenium powder is exposed to an argon/helium inductively coupled plasma at near atmospheric pressure where the individual particles are heated melted and spheroidised according to steps 104-106 of the process 100. Steps 104-106 also cause the vaporization of present impurities from the surface of the particles. The processed powders are then exposed to intense ultrasound vibration using a 100 W ultrasound horn generator 26 according to step 108. The tip 28 of the generator 26 is immersed in a 100 ml suspension of 250 g of the processed powder in acetone.

Figure 9:
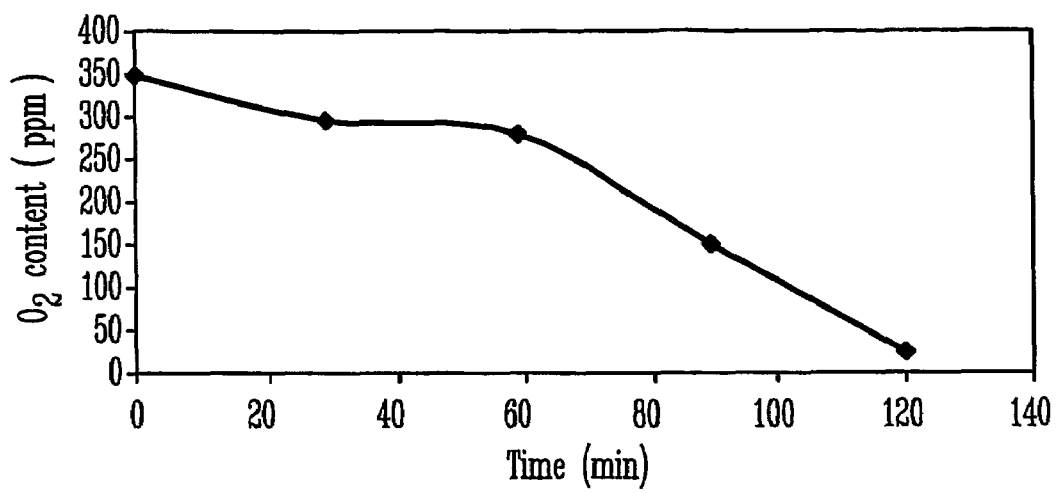
FIG. 9 is a graph showing the residual oxygen concentration of the ruthenium powder illustrated in FIGS. 8A-8E.

Electron micrographs of the plasma-processed ruthenium powder, at the onset of the sonification step 108 (t=0), and following different periods of sonification treatment (30, 60, 90 and 120 min), are shown in FIGS. 8A-8E. FIGS. 8A-8E show a gradual and systematic purification of the powder through the dislodging of the soot particles from the surface of the ruthenium particles. The purification effect is also confirmed by oxygen level analysis of the powder given in FIG. 9 as function of the sonification time (step 108). The results clearly indicate a significant drop in the residual oxygen level of the powder with the sonification time beyond the first 60 minutes of treatment for a sonification power level of 100 W used in the experiments.

Synthesis of Nanosized Tungsten Powders

The third example relates to the synthesis of nanosized powders using the process 100. According to this example, the process 100 is used for the synthesis of nanopowders of a refractory metal such as tungsten through the partial vaporization of a fine metallic tungsten powder in an argon/hydrogen inductively coupled plasma at near atmospheric pressure, followed by the rapid quench of the plasma gases and the generated metallic vapors (steps 104-106). The rapid quench is achieved through the injection of a cold gas stream. Rapid quenching can also be achieved through an atomized liquid stream or by contact of the plasma gases with a cold surface.

Figures 10A, 10B, 10C:
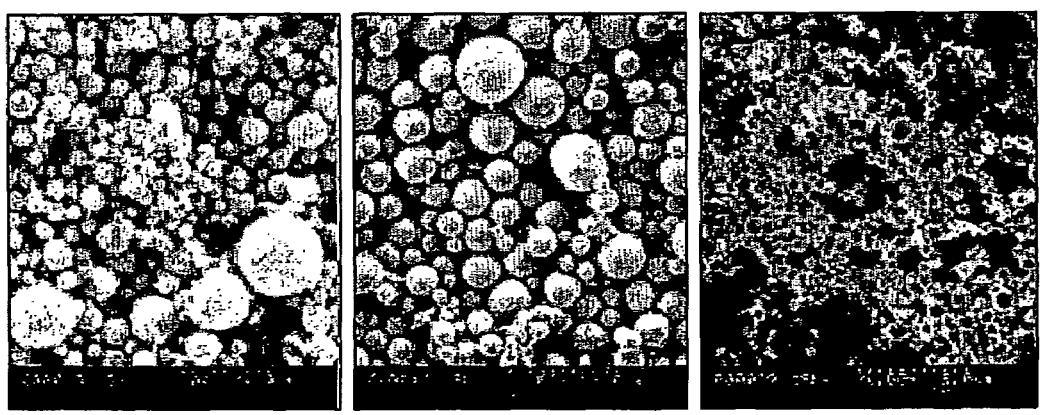
FIGS. 10A-10C are electron micrographs of tungsten powder after plasma treatment and respectively prior to sonification (FIG. 10A) and after sonification where coarse particle fraction (FIG. 10B) and fine particle fraction (FIG. 10C) are obtained.

The collected mixture of formed tungsten nanopowders and residual partially-vaporized tungsten powder is subjected to an intense sonification step 108 in order to separate the nanopowder from the larger tungsten particles. FIG. 10A shows an electron micrograph of the mixed coarse and nano-sized tungsten powders as collected at the exit of the plasma reactor and quench section (see FIG. 2).

Electron micrographs of the corresponding coarse and fine powder fractions obtained through intense sonification with acetone as the sonification fluid are given respectively in FIGS. 10B and 10C. The corresponding particle size distribution of the mixed powder and each of the separated coarse and fine powder fractions after sonification are given in FIGS. 11A-11C.

Although the present invention has been described hereinabove by way of preferred embodiments thereof, it can be modified without departing from the spirit and nature of the subject invention, as defined in the appended claims.

What is claimed is:

1. A process for the purification of a material comprising:
   providing powder particles of the material including impurities;
   plasma heating and melting of said powder particles of the material and release of said impurities in vapour phase through a plasma stream, yielding molten particle droplets of the material mixed in said plasma stream and vaporized impurities;
   cooling of said molten particle droplets of the material mixed in said plasma stream with said vaporized impurities, yielding a mixture of purified powder particles of the material and soot;
   exposing said mixture of purified powder particles of the material and soot material to ultrasound vibrations in a sonification medium, yielding separated purified powder particles of the material and soot in said sonification medium; and
   recovering said purified powder particles of the material from said sonification medium and said soot.

2. A process as recited in claim 1, wherein said sonification medium is selected from the group consisting of water, acetone, alcohol and air.

3. A process as recited in claim 1, wherein recovering said purified powder particles of the material from said sonification medium and said soot includes separation of said purified powder particles of the material by wet sieving, differential sedimentation under normal gravitational forces, or by intense centrifugation.

4. A process as recited in claim 1, wherein recovering said purified powder particles of the material from said sonification medium includes filtration of the sonification medium.

5. A process as recited in claim 1, wherein said plasma heating and melting of said powder particles of the material through a plasma stream is achieved by injecting said powder particles in an inductively coupled radio frequency plasma stream using a carrier gas.

6. A process as recited in claim 1, wherein said plasma heating and melting of said powder particles of the material through a plasma stream is performed under a pressure selected from the group consisting of atmospheric, low pressure, and above atmospheric pressure.

7. A process as recited in claim 1, wherein said plasma stream is achieved under condition selected from the group consisting of an inert, an oxidizing or a reducing atmosphere.

8. A process as recited in claim 1, wherein said powder particles of the material being provided in raw form.

9. A process as recited in claim 1, wherein said ultrasound vibrations are produced using an ultrasound generator characterized by having an intensity in the range of about 100 W to about 10 kW.

10. A process as recited in claim 1, wherein said cooling of said molten particle droplets of the material mixed in said plasma stream is achieved by rapid quenching of said molten particle droplets of the material mixed in said plasma stream.

11. A process as recited in claim 10, wherein said rapid quenching is achieved through the injection of a cold gas stream, an atomized liquid stream, or contact with a cold surface.

12. A process as recited in claim 1, wherein the material is selected from the group consisting of a ceramic, a pure metal, an alloy and a composite.

13. A process as recited in claim 12, wherein said metal is selected from the group consisting of silicon, chromium, molybdenum tungsten, tantalum and ruthenium.

14. A process as recited in claim 1 for improving the flow properties of said powder material.

15. A process as recited in claim 1 for lowering the oxygen content of the powder particles.

16. A process as recited in claim 1 for the purification of powder material for the manufacture of solar cells or sputtering target.

17. A process as recited in claim 1 for the separation of nanopowder mixed with a coarse powder.

18. A process for the synthesis of a material nanopowder comprising:
   i) providing the material in powder form;
   ii) plasma heating, melting and vaporization of said powder of the material through a plasma stream, yielding the material in vapour form mixed with partially vaporized particles in said plasma stream;
   iii) running the material in vapour form mixed with partially vaporized particles in said plasma stream through a quench stream, yielding a mixture of formed material nanopowder and residual coarse material powder; and
   iv) exposing said mixture of formed material nanopowder and residual coarse material powder to ultrasound vibrations in a sonification medium, yielding separated nanopowder particles of said material and coarse powder of said material.

19. A process as recited in claim 18, further comprising v) recovering at least one of said separated nanopowder particles of said material and said residual coarse powder of said material.

20. A process as recited in claim 19, wherein step v) includes separation said separated nanopowder particles of said material and coarse powder of said material by wet sieving, differential sedimentation under normal gravitational forces, or by intense centrifugation.

21. A process as recited in claim 19, wherein step v) includes filtration of the sonification medium.

22. A process as recited in claim 18, wherein said sonification medium is selected from the group consisting of water, acetone, alcohol and air.

23. A process as recited in claim 18, wherein said sonification includes the production of ultrasound vibrations characterized by having an intensity in the range of about 100 W to about 10 kW.

24. A process as recited in claim 18, wherein said plasma heating and melting of said powder of the material through said plasma stream is achieved by injecting said powder in an inductively coupled radio frequency plasma stream using a carrier gas.

25. A process as recited in claim 24, wherein said plasma heating and melting of said powder particles of the material through a plasma stream is performed under a pressure selected from the group consisting of atmospheric, low pressure, and above atmospheric pressure.

26. A process as recited in claim 24, wherein said plasma stream is achieved under condition selected from the group consisting of an inert, an oxidizing or a reducing atmosphere.

27. A process as recited in claim 18, wherein the material is selected from the group consisting of a ceramic, a pure metal, an alloy and a composite.

* * * * *

UNITED STATES PATENT AND TRADEMARK OFFICE
CERTIFICATE OF CORRECTION

PATENT NO. : 7,572,315 B2  
APPLICATION NO. : 10/569916  
DATED : August 11, 2009  
INVENTOR(S) : Boulos et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 315 days.

Signed and Sealed this

Seventh Day of September, 2010

David J. Kappos
*Director of the United States Patent and Trademark Office*